United States Patent
Hsiao

(10) Patent No.: US 7,584,682 B2
(45) Date of Patent: Sep. 8, 2009

(54) ADJUSTMENT DEVICE WITH A DUAL-GUIDING STRUCTURE

(75) Inventor: Hsueh-Sheng Hsiao, Jhuci Township, Chiayi County (TW)

(73) Assignee: Chern Shing Top Co., Ltd., Chiayi County (TW)

( * ) Notice: Subject to any disclaimer, the term of this patent is extended or adjusted under 35 U.S.C. 154(b) by 146 days.

(21) Appl. No.: 11/834,846

(22) Filed: Aug. 7, 2007

(65) Prior Publication Data

US 2009/0039131 A1  Feb. 12, 2009

(51) Int. Cl.
*F16H 1/16* (2006.01)

(52) U.S. Cl. .................. 74/425; 74/10.85; 74/10.8; 74/10.27

(58) Field of Classification Search .................. 74/425, 74/10 R, 10.2, 10.27, 10.33, 10.39, 10.45, 74/10.7, 10.8, 10.85
See application file for complete search history.

(56) References Cited

U.S. PATENT DOCUMENTS

| | | | | |
|---|---|---|---|---|
| 3,828,613 A | * | 8/1974 | Sfreddo | ..................... 74/10.41 |
| 3,964,000 A | * | 6/1976 | Schijven | ........................ 334/7 |
| 4,683,770 A | * | 8/1987 | Nettmann | ..................... 74/425 |
| 5,365,801 A | * | 11/1994 | Nakamura | .................... 74/425 |
| 6,076,266 A | * | 6/2000 | Beckingham et al. | ......... 33/292 |
| 7,261,013 B2 | * | 8/2007 | Kachouh et al. | .............. 74/425 |
| 2002/0023514 A1 | * | 2/2002 | Matsukawa | .................. 74/425 |
| 2003/0173843 A1 | * | 9/2003 | Sakai et al. | .................... 310/71 |
| 2004/0226395 A1 | * | 11/2004 | Diana et al. | ................... 74/425 |
| 2008/0223164 A1 | * | 9/2008 | Greulich et al. | ............... 74/425 |
| 2009/0000407 A1 | * | 1/2009 | Meyer et al. | ................. 74/10.1 |

* cited by examiner

*Primary Examiner*—David M Fenstermacher
(74) *Attorney, Agent, or Firm*—Alan Kamrath; Kamrath & Associates PA

(57) ABSTRACT

An adjustment device with a dual-guiding structure has two worm wheels respectively meshed with two coaxial worm gears. The two worm gears are pivotally and longitudinally fixed by a driving shaft in line. An adjacent end of each worm gear has a locking recess to receive a locking head mounted on the driving shaft. Thereby, the locking head is selectively engaged with the locking recess of one of the worm gears to drive the corresponding worm gear when the locking head on the driving shaft is reciprocated. Then, one worm wheel engaged with the corresponding worm gear is rotated to rewind or release the wires on the work wheel.

4 Claims, 7 Drawing Sheets

ADJUSTMENT DEVICE WITH A DUAL-GUIDING STRUCTURE

BACKGROUND OF THE INVENTION

1. Field of the Invention

The present invention relates to an adjustment device, and more particularly to an adjustment device composed of two worm gears coaxially combined together, two worm wheels respectively engaged with the two worm gears, and a shaft with a locking device.

2. Description of Related Art

A wire-guiding adjustment device is a structure for winding and releasing wires to vary positioning of an attached element by controlling the released length of the wires. For example, if an upper end and a lower end of a resilient backrest are controlled by the wires, the resilient backrest is bent into a big curved arc when the wires are wound to be shorter. On the other hand, when the wires are released to be longer, the resilient backrest rebounds to a straight shape. Therefore, the wire-guiding adjustment device has a wide application and various modifications in structures.

A conventional wire-guiding adjustment device is limited in technical aspects and generally comprises a single guiding wheel that can be selectively arranged to receive one or two counter wound wires to synchronously operate the wires for changing the shape or position of the attached element such as the resilient backrest. However, controlling the resilient backrest usually needs multiple sets of the wire-guiding adjustment devices. For example, two conventional wire-guiding adjustment devices are needed for arc control and height control of the resilient backrest in operation. Providing the resilient backrest with the wire-guiding adjustment devices is not only cost-wasting but also time-consuming, because it is hard to find proper locations and spaces for multiple sets which are neat in appearance and also not confusing in functions to users.

SUMMARY OF THE INVENTION

A main objective of the present invention is to provide an adjustment device with a dual-guiding structure that is composed of two worm gears, a shaft penetrating the two worm gears, and two worm wheels respectively engaged with the worm gears. Thus, the adjustment device can receive multiple wires on the two worm wheels for multi-functional controlling.

The main objective of the present invention is to provide an adjustment device with a dual-guiding structure that is convenient in assembly for workers and in operation for users.

To achieve the foregoing objectives, the adjustment device with a dual-guiding structure comprises:

two wire-guiding sets, each wire-guiding set having a worm wheel;

two worm gears coaxially combined together and respectively meshing with the worm wheels on the two wire-guiding sets, wherein each worm gear has an adjacent end and a locking recess defined in the adjacent end; and a driving shaft axially penetrating the two worm gears and having a locking head mounted on the driving shaft to selectively engage with the locking recess on one of the worm gears.

Thereby, the two wire-guiding sets can be selectively and conveniently controlled by the driving shaft to control the rewind and release of the wire.

Further benefits and advantages of the present invention will become apparent after a careful reading of the detailed description with appropriate reference to the accompanying drawings.

DETAILED DESCRIPTION OF THE PREFERRED EMBODIMENT

An adjustment device with a dual-guiding structure in accordance with the present invention has two worm wheels respectively meshed with two coaxial worm gears (the worm wheel and worm shaft structure is an application of gear and threaded shaft). Two worm gears are pivotally and axially fixed by a driving shaft. An adjacent end of each worm gear has a locking recess to receive a locking head mounted on the driving shaft. Thereby, the locking head is selectively engaged with the locking recess to drive the corresponding worm gear when the locking head on the driving shaft moves in reciprocation. Then, one worm wheel engaged with the corresponding worm gear is rotated to rewind or release the wires on the work wheel.

For more modification, the adjustment device selectively comprises at least two gears and at least two worn wheels respectively engaged with the worn gears so that the adjustment device receives multiple wires on the two worn wheels for multi-functional controlling.

Figure 1:
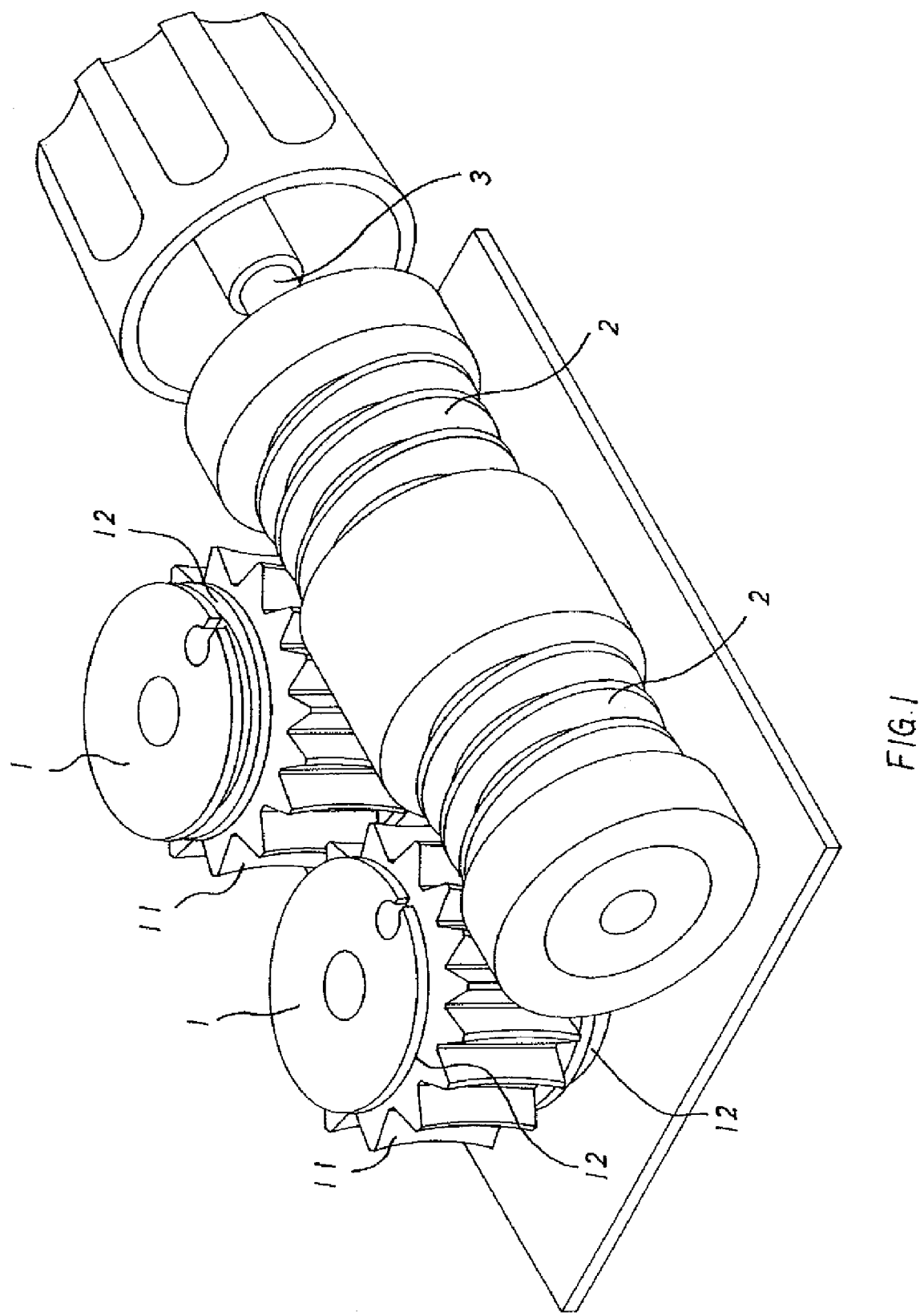
FIG. 1 is a perspective view of an adjustment device with a dual-guiding structure in accordance with the present invention.
Figure 2:
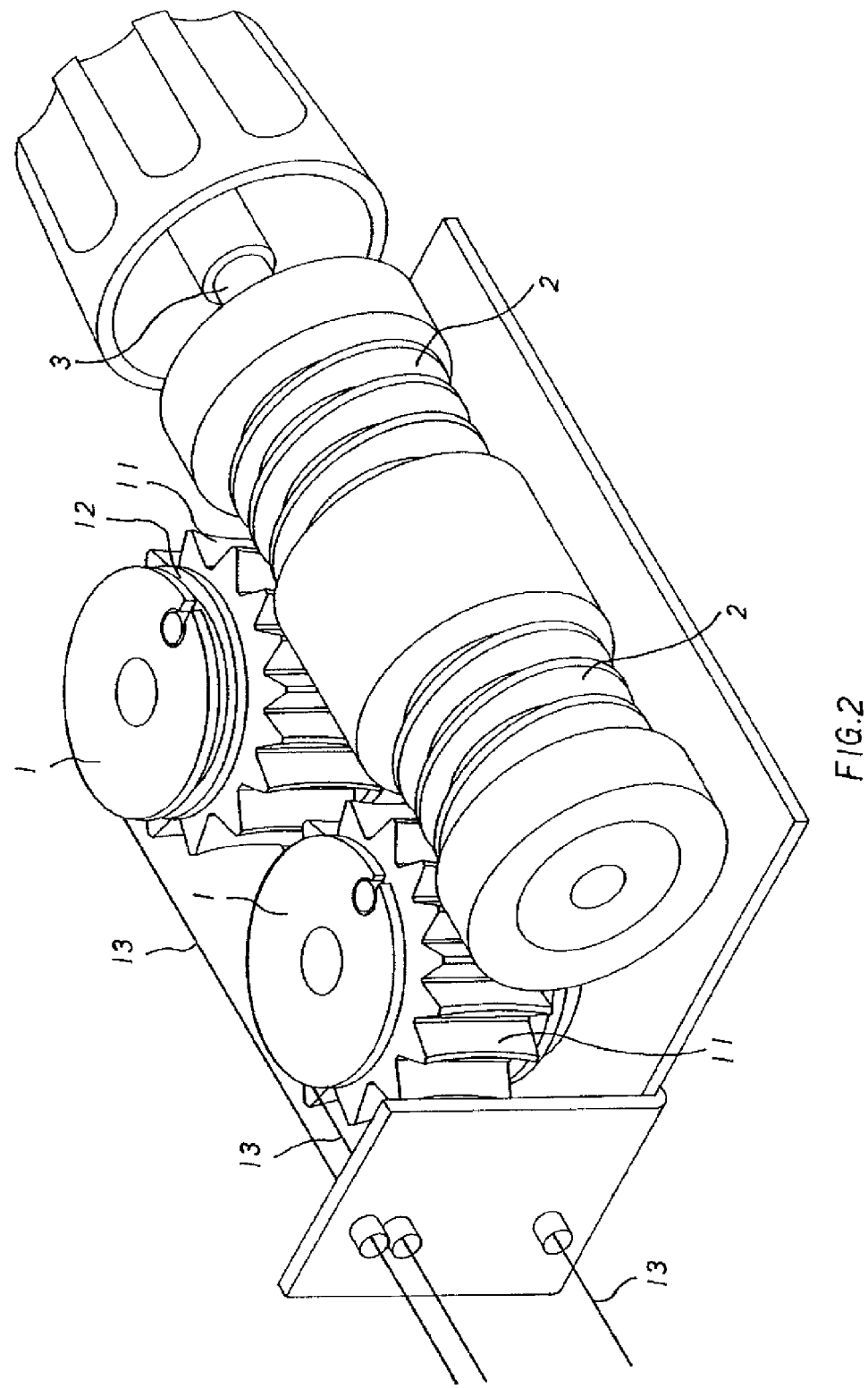
FIG. 2 is a perspective view of the adjustment device with a dual-guiding structure that combines with multiple wires in operation.
Figure 3:
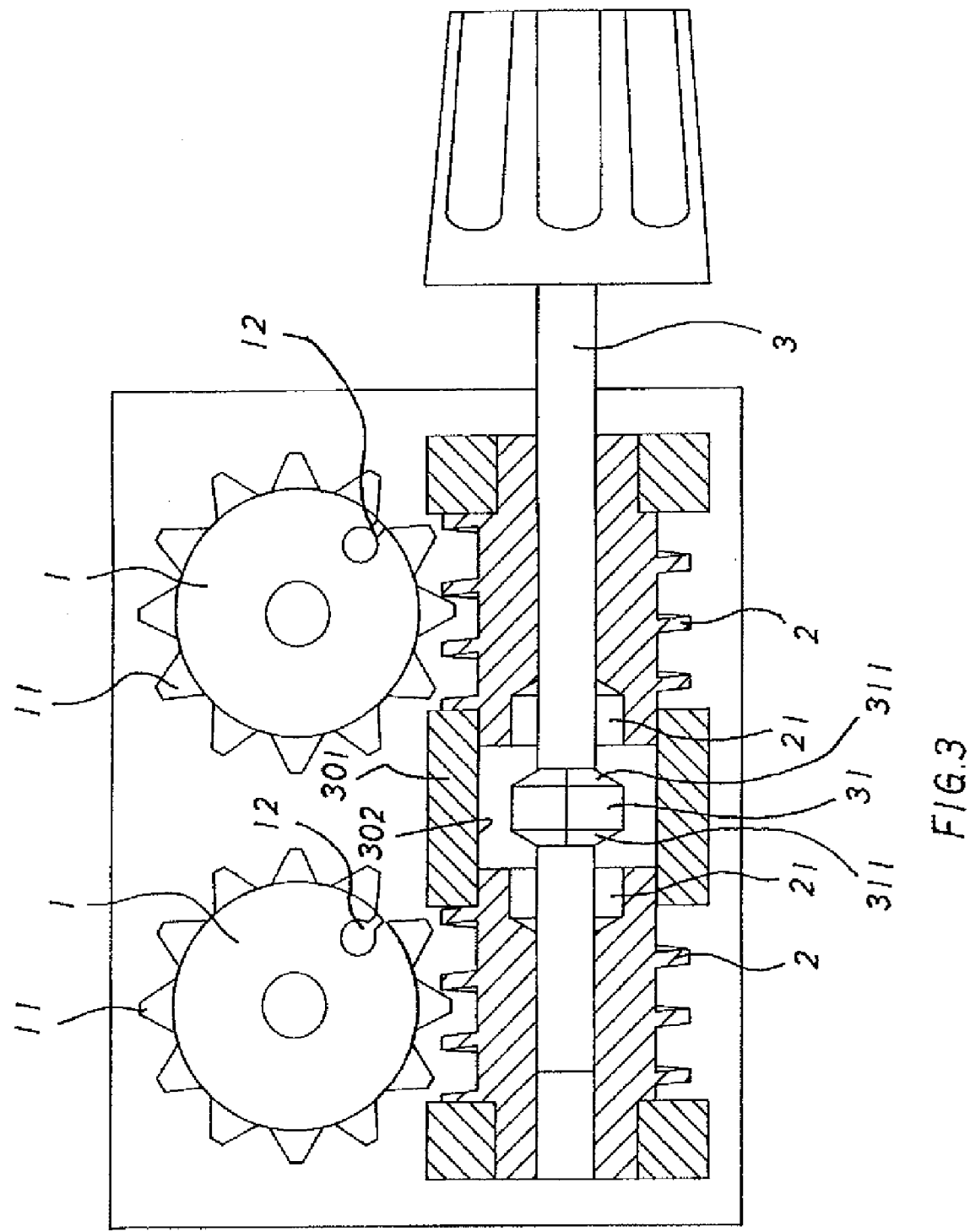
FIG. 3 is a cross-sectional side view of the adjustment device with a dual-guiding structure in FIG. 1.

A preferred embodiment of the adjustment device with a dual-guiding structure has two wire-guiding sets 1 each with a worm wheel 11 (as shown in FIGS. 1 and 2), two worm gears 2, a driving shaft 3, and a locking head 31. The wire-guiding set 1 includes a reel mounted over the worn wheel 11 to collect wires 13 wound thereon. The two worm gears 2 are coaxially combined together by the driving shaft 3 to mesh with the two worn wheels 11. The locking head 31 is formed on a middle section of the driving shaft 3. Each worm gear 2 has an adjacent end and a locking recess 21 defined at the adjacent end to correspondingly face another locking recess 21 on the other worn gear 2 as shown in FIG. 3 and to operationally receive the locking head 31 for driving control. Additionally, a sleeve 301 spaces the two worn gears 2 to form a chamber 302 between the two adjacent ends of the worm gears 2 to accommodate the locking head 31. When the locking head 31 on the driving shaft 3 is engaged with the locking recess 21 of one worm gear 2, the worm gear 2 is driven to rotate the engaged worn wheel 11 so that the wire 13 on the wire-guiding set 1 is rewound or released.

According to above described structure, a wire ring 12 on the wire-guiding set 1 is provided for attaching the wire 13.

Figure 4:
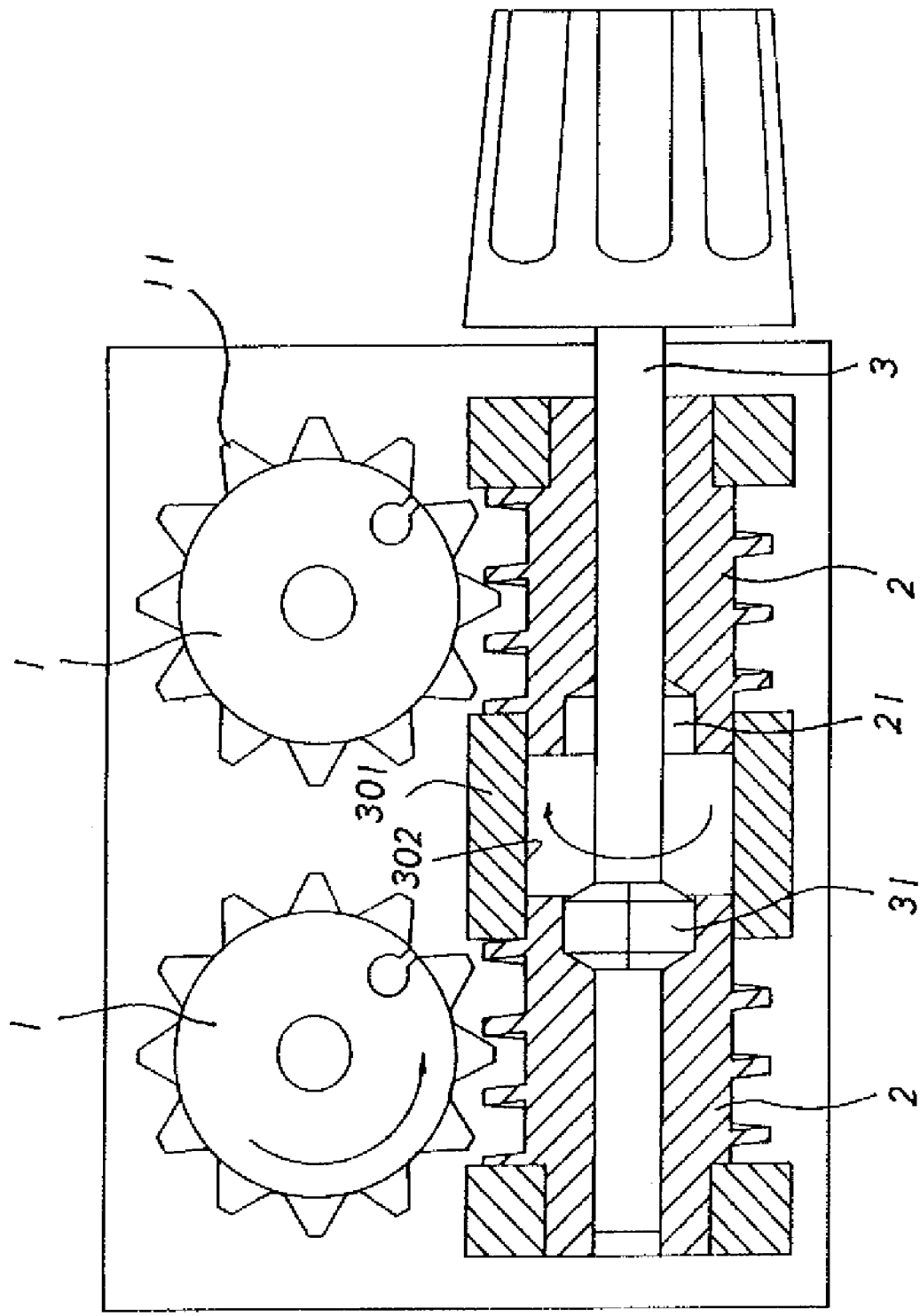
FIG. 4 is an operational cross-sectional side view of the adjustment device with a dual-guiding structure.
Figure 5:
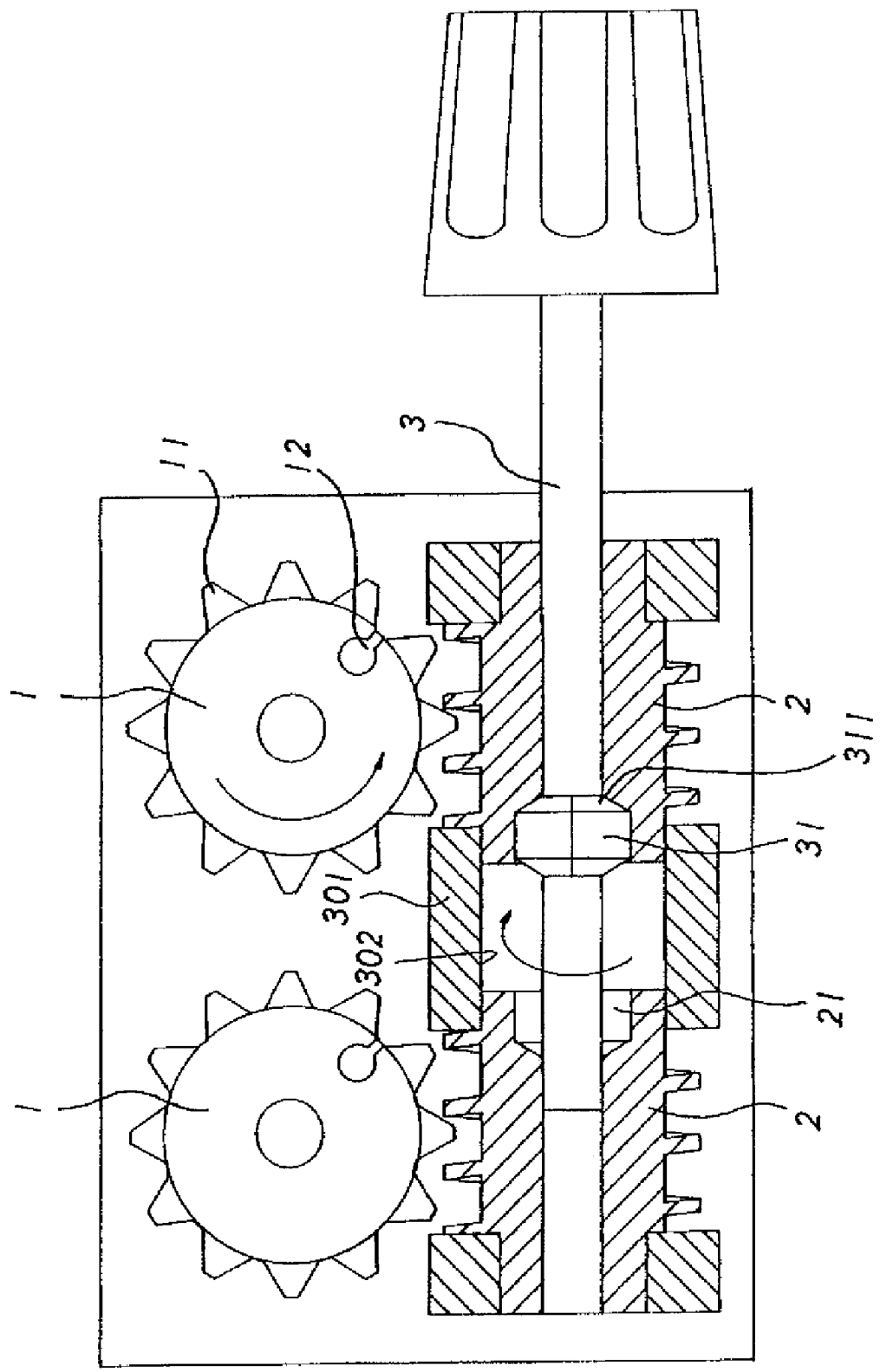
FIG. 5 is another operational cross-sectional side view of the adjustment device with a dual-guiding structure.

The wire-guiding set 1 can include one or more wire rings 12 for wires, for different operational purposes. Since attaching one or two wires on the wire-guiding set is conventional, further description is not provided. The rotation of the wire-guiding set 1 controls the rewind or the release of the wire 13. Because the worm wheel 11 on the wire-guiding set 1 meshes with the worm gear 2, the wire-guiding set 1 is positioned by the worm gear 2 when the driving shaft 3 does not rotate. The worm gear 2 drives the worm wheel 11, but the worm wheel 11 can not drive the worm gear 2 in reverse. Therefore, the worm gear 2 efficiently controls the wire 13 on the wire-guiding set 1. When the locking head 31 on the driving shaft 3 slides into the locking recess 21 on one of the corresponding worm gears 2 (s shown in FIGS. 4 and 5), the rotation of the driving shaft 3 drives the worm gear 2 engaged with the locking head 31 to control the wire 13. In the same manner, the other worm gear 2 is driven when the locking head 31 slides into the locking recess 21 of the other worm gear 2. Therefore, the two wire-guiding sets 1 can be selectively operated by the same driving shaft 3 to perform different functions.

Figure 6:
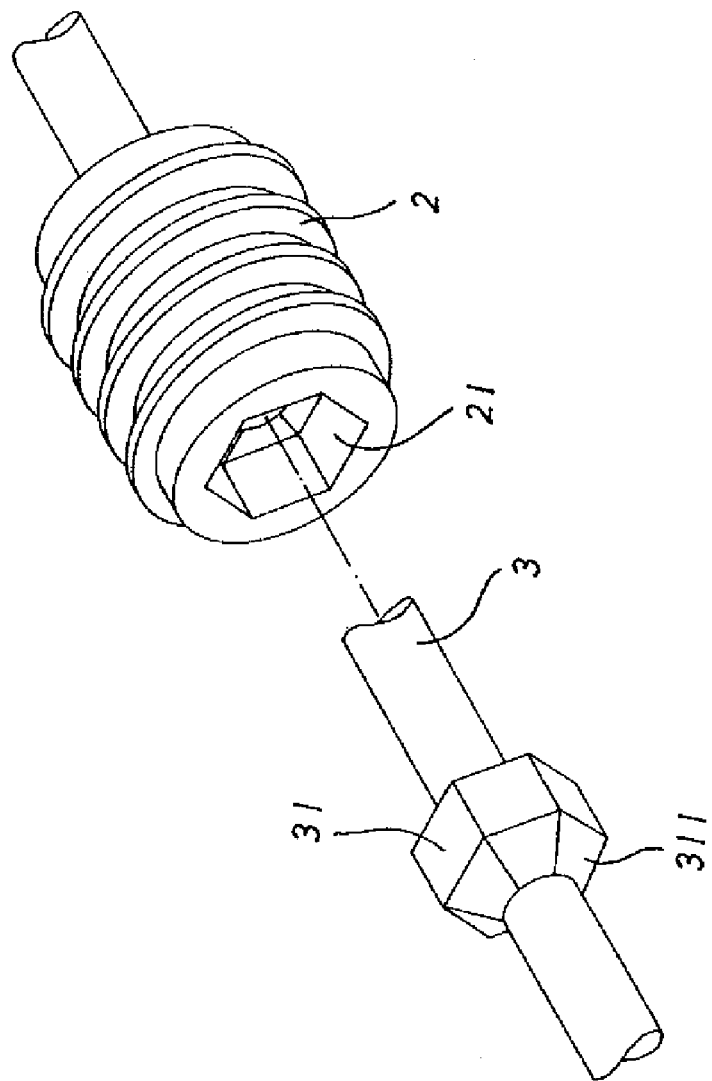
FIG. 6 is partially exploded perspective view of one embodiment of a driving shaft in the adjustment device.
Figure 7:
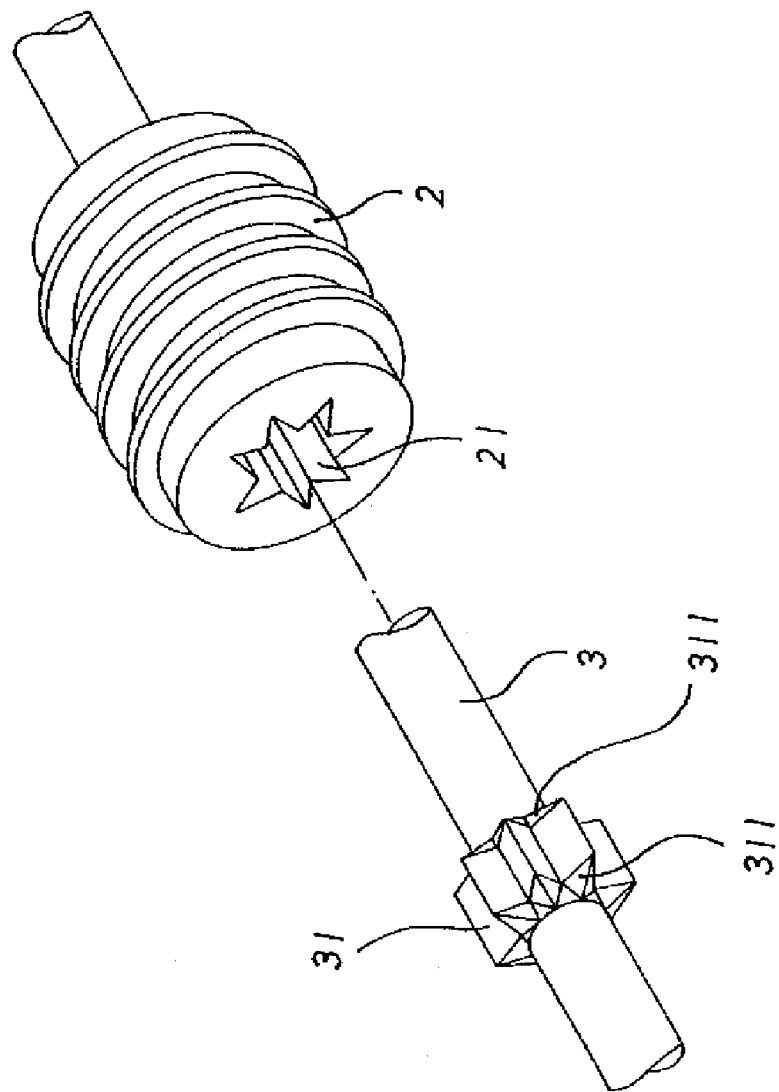
FIG. 7 is partially exploded perspective view of another embodiment of a driving shaft in the adjustment device.

To allow the locking head 31 to smoothly and easily engage with the locking recess 21, the locking head 31 has two distal ends and a leading angled point 311 at each distal end (as shown in FIGS. 6 and 7), i.e., each distal end is tapered in cross-section. Preferably, the locking head 31 is polygonal and the locking recess 21 is polygonal in correspondence to provide sufficient driving force. The shape of the locking head 31 and the locking recess 21 can be modified and is not limited to hexagonal or star shape as shown in FIGS. 6 and 7.

Moreover, the wire rings 12 on the two wire-guiding sets 1 are arranged at different heights (as shown in FIG. 2) to form a height difference to allow the wires 13 to extend outward without a tangling concern.

Although this invention has been described in its preferred form with a certain degree of particularity, it is understood that the present invention of the preferred form has been made only by way of example and that numerous changes in the details of construction and the combination and arrangement of parts any be resorted to without departing from the spirit and scope of the invention.

What is claimed is:

1. An adjustment device with a dual-guiding structure comprising:
    two wire-guiding sets, each wire-guiding set having a worm wheel;
    two worm gears coaxially combined together and respectively meshing with the worm wheels on the two wire-guiding sets, wherein each worm gear has an adjacent end and a locking recess defined in the adjacent end; and
    a driving shaft axially penetrating the two worm gears and having a locking head mounted on the driving shaft to selectively engage with the locking recess on one of the two worm gears.

2. The adjustment device with a dual-guiding structure as claimed in claim 1, wherein the locking head has two, tapered, distal ends.

3. The adjustment device with a dual-guiding structure as claimed in claim 1, wherein each of the two wire-guiding sets comprises:
    a reel mounted over the worm wheel and having at least one wire ring attached to the reel; and
    at least one wire respectively attached to the at least one wire ring and wound on the reel.

4. The adjustment device with a dual-guiding structure as claimed in claim 1, wherein a sleeve spaces the two worm gears to form a chamber between the adjacent ends of the two worm gears to accommodate the locking head.

* * * * *